United States Patent
Watanabe et al.

(10) Patent No.: US 7,200,260 B1
(45) Date of Patent: Apr. 3, 2007

(54) TEACHING MODEL GENERATING DEVICE

(75) Inventors: Atsushi Watanabe, Tokyo (JP); Taro Arimatsu, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 09/546,213

(22) Filed: Apr. 10, 2000

(30) Foreign Application Priority Data

Apr. 8, 1999 (JP) .................................. 11-101890

(51) Int. Cl.
*G06K 9/00* (2006.01)
*G06K 9/62* (2006.01)
*G06F 19/00* (2006.01)
*G05B 19/00* (2006.01)
*G05B 15/00* (2006.01)
*G05B 19/18* (2006.01)

(52) U.S. Cl. ............... 382/153; 382/103; 382/141; 382/155; 382/159; 901/3; 901/47; 700/57; 700/110; 700/159; 700/259

(58) Field of Classification Search ............... 382/153, 382/151, 152, 141–160, 103, 115; 901/47, 901/3, 46; 700/57–64, 95–99, 110, 159–163, 700/245–260; B25J 9/16, 9/22
See application file for complete search history.

(56) References Cited

U.S. PATENT DOCUMENTS

| | | | | |
|---|---|---|---|---|
| 3,804,270 A | * | 4/1974 | Michaud et al. ............ 414/267 |
| 4,187,051 A | * | 2/1980 | Kirsch et al. ............ 414/744.3 |
| 4,462,046 A | * | 7/1984 | Spight ............ 348/94 |
| 4,504,970 A | * | 3/1985 | Werth et al. ............ 382/159 |
| 4,611,292 A | * | 9/1986 | Ninomiya et al. ............ 702/153 |
| 4,731,853 A | * | 3/1988 | Hata et al. ............ 382/153 |
| 4,785,528 A | * | 11/1988 | Soderberg ............ 29/701 |
| 4,835,450 A | * | 5/1989 | Suzuki ............ 318/568.13 |
| 4,845,765 A | * | 7/1989 | Juvin et al. ............ 382/153 |
| 4,876,728 A | * | 10/1989 | Roth ............ 382/153 |

(Continued)

FOREIGN PATENT DOCUMENTS

EP 0 204 516 12/1986

(Continued)

OTHER PUBLICATIONS

Iida et al., English translation of Japanese application 07-319525.*

(Continued)

*Primary Examiner*—Bhavesh M. Mehta
*Assistant Examiner*—Manav Seth
(74) *Attorney, Agent, or Firm*—Staas & Halsey LLP

(57) ABSTRACT

A workpiece W serving as an object for detection is fixed in place. A camera 20 is mounted to the end of a robot RB. The camera is turned about an axis, which passes through the center position of the workpiece W and is perpendicular to the optical axis of the camera, to take an image of the workpiece W at a plurality of positions in different directions. A teaching model is generated on the basis of each produced image data. The relative position and posture of the workpiece to the camera 20 is also stored in association with the teaching model. Thus, it is possible to easily generate the teaching model of the workpiece regardless of three-dimensional variations in posture.

14 Claims, 10 Drawing Sheets

U.S. PATENT DOCUMENTS

| | | | |
|---|---|---|---|
| 4,909,376 A * | 3/1990 | Herndon et al. | 198/395 |
| 4,985,846 A * | 1/1991 | Fallon | 382/153 |
| 5,148,591 A * | 9/1992 | Pryor | 29/407.04 |
| 5,329,469 A * | 7/1994 | Watanabe | 700/259 |
| 5,446,835 A * | 8/1995 | Iida et al. | 700/259 |
| 5,499,306 A | 3/1996 | Sasaki et al. | |
| 5,577,130 A * | 11/1996 | Wu | 382/106 |
| 5,621,807 A * | 4/1997 | Eibert et al. | 382/103 |
| 5,745,387 A * | 4/1998 | Corby et al. | 703/1 |
| 5,790,687 A * | 8/1998 | McLaughlin et al. | 382/111 |
| 5,987,591 A * | 11/1999 | Jyumonji | 700/259 |
| 6,101,455 A * | 8/2000 | Davis | 702/94 |
| 6,114,824 A * | 9/2000 | Watanabe | 318/568.12 |
| 6,328,523 B1 * | 12/2001 | Watanabe et al. | 414/416.01 |
| 6,349,245 B1 * | 2/2002 | Finlay | 700/245 |
| 6,490,369 B1 * | 12/2002 | Beiman | 382/153 |

FOREIGN PATENT DOCUMENTS

| | | | |
|---|---|---|---|
| GB | 2123172 A * | 1/1984 | |
| JP | 62-57884 | 3/1987 | |
| JP | 02110788 A * | 4/1990 | |
| JP | 04-75887 | 3/1992 | |
| JP | 04-370703 | 12/1992 | |
| JP | 07-270137 | 10/1995 | |
| JP | 7-318327 | 12/1995 | |
| JP | 7-319525 | 12/1995 | |

OTHER PUBLICATIONS

No. 004552, Notice of Grounds for Rejection for Serial No. 101890/1999, Japanese Communication with an English translation, mailed Jan. 29, 2002.

Dongheui Lee et al.; "A Reliable Position Estimation Method of the Service Robot by the Map Matching"; Proceedings of the 2003 IEEE International Conference on Robotics & Automation, Sep. 14-19, 2003; pp. 2830-2835.

* cited by examiner

TEACHING MODEL GENERATING DEVICE

BACKGROUND OF THE INVENTION

1. Field of the Invention

This invention relates to a device for generating a teaching model applied to a method of detecting the position and posture of an object through pattern matching. More particularly, the present invention relates to a device for generating a teaching model for making it possible to detect an object regardless of three-dimensional variations in position and posture of the object for detection.

2. Description of the Prior Art

There is provided a well-known method and device for detecting the position and posture of an object set on a plane by storing a two-dimensional image of the object for detection as a teaching model prior to pattern matching of the teaching model with image data produced by means of taking an image of the object with an image pickup means such as a camera. The above method and device for detecting the object is applied to conveyance or like jobs of machine parts and articles or like workpieces grasped with a robot to a predetermined position in an automatic mode.

However, picking-out of an individual workpiece from a pile of disordered same-shaped workpieces or a set of same-shaped workpieces housed within a predetermined range in any three-dimensionally different position and posture is not suited for the robot, and therefore, requires manual operation. In the case of allowing the robot to pick out such an individual workpiece, there is the need for the manual operation of picking out the workpieces one by one from the pile of disordered workpieces for reoriented alignment such that the robot may pick out the individual workpiece directly.

For allowing the robot to grasp each workpiece for picking out from a large number of same-shaped workpieces piled up disorderly or housed within the predetermined range in any three-dimensionally different position and posture, it is necessary for the robot to recognize the position and posture (direction) of each of the above workpieces.

In this connection, a device for detecting the three-dimensional position and posture (direction) of the individual workpiece among the workpieces has been developed. This device performs the following operations.

(1) To produce image data in advance by taking an image of one of same-shaped workpieces for detection with a camera from different directions (2) To store a plurality of teaching models based on the produced image data, together with the relative position and posture of each teaching model to the workpiece (3) To select a teaching model of a high matching value by carrying out pattern matching of each teaching model with image data produced by taking an image of the piled same-shaped workpieces with the camera (4) For this selected teaching model to detect the position and posture (direction) of the target workpiece for detection to the selected teaching model on the basis of the relative position and posture of each teaching model to the workpiece, stored in the above operation (2).

The above device requires a plurality of teaching models generated by taking the image of the workpiece from the plurality of directions as shown in the above operation (1).

OBJECTS AND SUMMARY OF THE INVENTION

It is an object of the present invention to provide a device for generating a teaching model applied to an image processing device for detecting the three-dimensional position and posture of an object.

The present invention relates to a teaching model generating device for image processing, in which an object or an article having the same shape as that of the object is selected as a reference object, and three-dimensional position and/or posture of the object is recognized by carrying out matching processing of a plurality of teaching models, which were generated and stored in advance on the basis of the respective image data produced by taking the image of the reference object from a plurality of directions, with the image data including the object.

According to the first mode of the invention, one of the reference object and the image pickup means is fixed in place, while the other is fixed to a movable part of a robot or is grasped with a hand of the robot, and the robot is operated for positioning to a plurality of image pickup positions where direction of the optical axis of the image pickup means with respect to the reference object is different from one another respectively, so that the image data respectively obtained at each of the image pickup positions is stored as a teaching model.

According to the second mode of the invention, the reference object is fixed to a movable part of a first robot or is grasped with a hand of the first robot, and an image pickup means is fixed to a movable part a second robot or is grasped with a hand of the second robot, and any one of or both of these first and second robots is operated for positioning to a plurality of image pickup positions where direction of the optical axis of the image pickup means with respect to the reference object is different from one another respectively, so that the image data respectively obtained at each of said image pickup positions is stored as a teaching model.

Preferably, the teaching model is a part of the image data of the reference object.

Preferably, the teaching model is composed of data obtained by performing a image processing on the image data of the reference object.

Preferably, the teaching model is generated for every direction in which the image pickup means took the image of the reference object and the teaching model is stored in association with the information on the direction.

Preferably, the image pickup means is a camera.

Preferably, the image pickup means is a three dimensional visual sensor whose image pickup means measures the distance between the image pickup means and a plurality of points on the object.

According to the present invention, the robot may be used to simply generate teaching models which are applied to an image processing device or the like for detecting the position and posture of an object through identification of the object regardless of three-dimensional variation in position and posture of the object.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

A teaching model generating device configured by a robot system will be described below as an embodiment according to the present invention.

Figure 1:
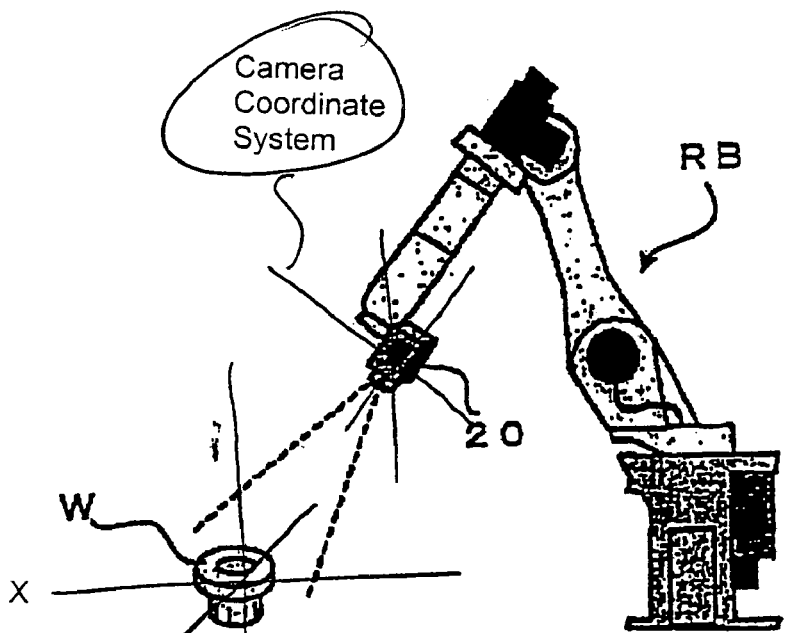
FIG. 1 is view for explaining the outline of a first embodiment according to the present invention.
Figure 4:
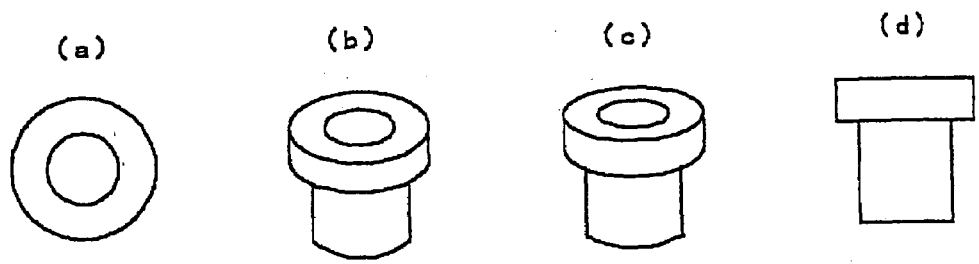
FIG. 4 is a view showing teaching models in each of the above embodiments.

FIG. 1 is a schematic view showing the first embodiment for generation of a teaching model according to the present invention. As shown in FIG. 1, a workpiece W is fixed in place to take an image of the workpiece W from a plurality of directions with an image pickup device 20 grasped with a hand of a robot RB (or fixed to a movable part of the robot RB). A teaching model of an object (the workpiece W) is generated on the basis of image data produced by taking the image of the workpiece. For instance, four teaching models are respectively generated on the basis of four image data produced by taking the image of the workpiece W from four directions as shown in FIG. 4.

Figure 5:
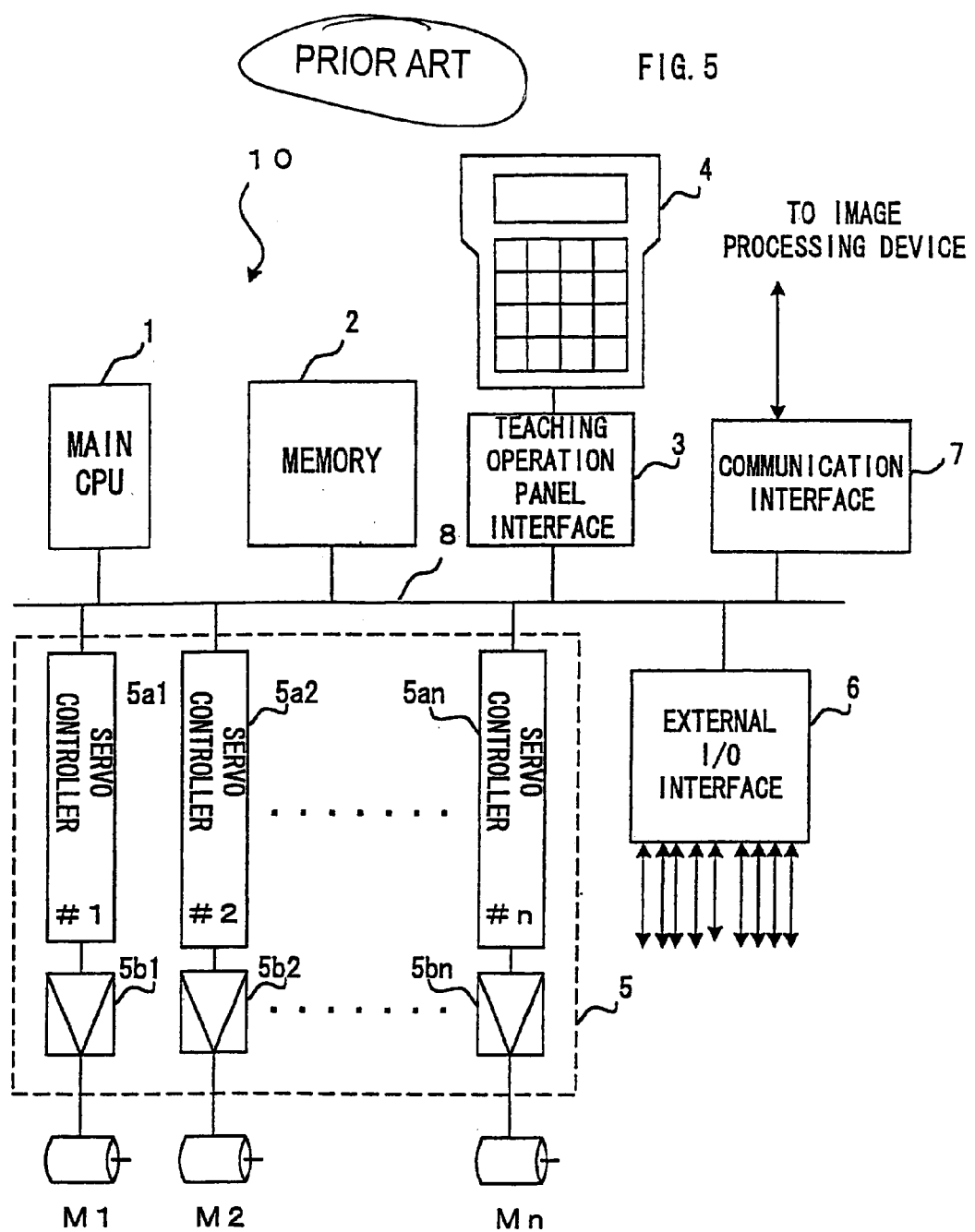
FIG. 5 is a block diagram showing an essential part of a robot controller in each of the above embodiments.

FIG. 5 is a block diagram showing an essential part of a controller of the robot RB in the present embodiment, and this controller has the same configuration as a robot controller in the prior art.

As shown in FIG. 5, connected to a bus designated by reference numeral 8 are a main processor (which will be hereinafter simply referred to as a processor) 1, a memory 2 composed of a RAM, a ROM and a non-volatile memory (EEPROM or the like), a teaching operation panel interface 3, an external device interface 6, a communication interface 7 for communication with an image processing device and a servo control unit 5. A teaching operation panel 4 is connected to the teaching operation panel interface 3.

A system program for supporting basic functions of the robot and the robot controller is stored in the ROM of the memory 2. An operation program and its related set data of the robot taught according to an application are stored in the non-volatile memory of the memory 2. The RAM of the memory 2 is used for a storage area for temporary storage of data in various processing executed by the processor 1.

The servo control unit 5 is equipped with servo controllers 5a1 to 5an (n being a number resulting from adding the number of movable axes of a tool mounted to a robot wrist to the total number of robot axes). Each servo controller is composed of a processor, a ROM and a RAM or the like to perform loop control of position and speed of a servo motor for driving each axis and also loop control of current. This servo controller constitutes a digital servo controller performing loop control of position, speed and current in software.

Output from the servo controllers 5a1 to 5an is provided through servo amplifiers 5b1 to 5bn to axis servo motors M1 to Mn to control the drive of these servo motors. Incidentally, although not shown, a position/speed detector is mounted to each of the servo motors M1 to Mn to detect the position and speed of each servo motor, and the detected position and speed are allowed to be fed back to the servo controllers 5a1 to 5an.

The input/output interface 6 is connected to sensors mounted to the robot, together with actuators and sensors of the peripheral equipment.

Figure 6:
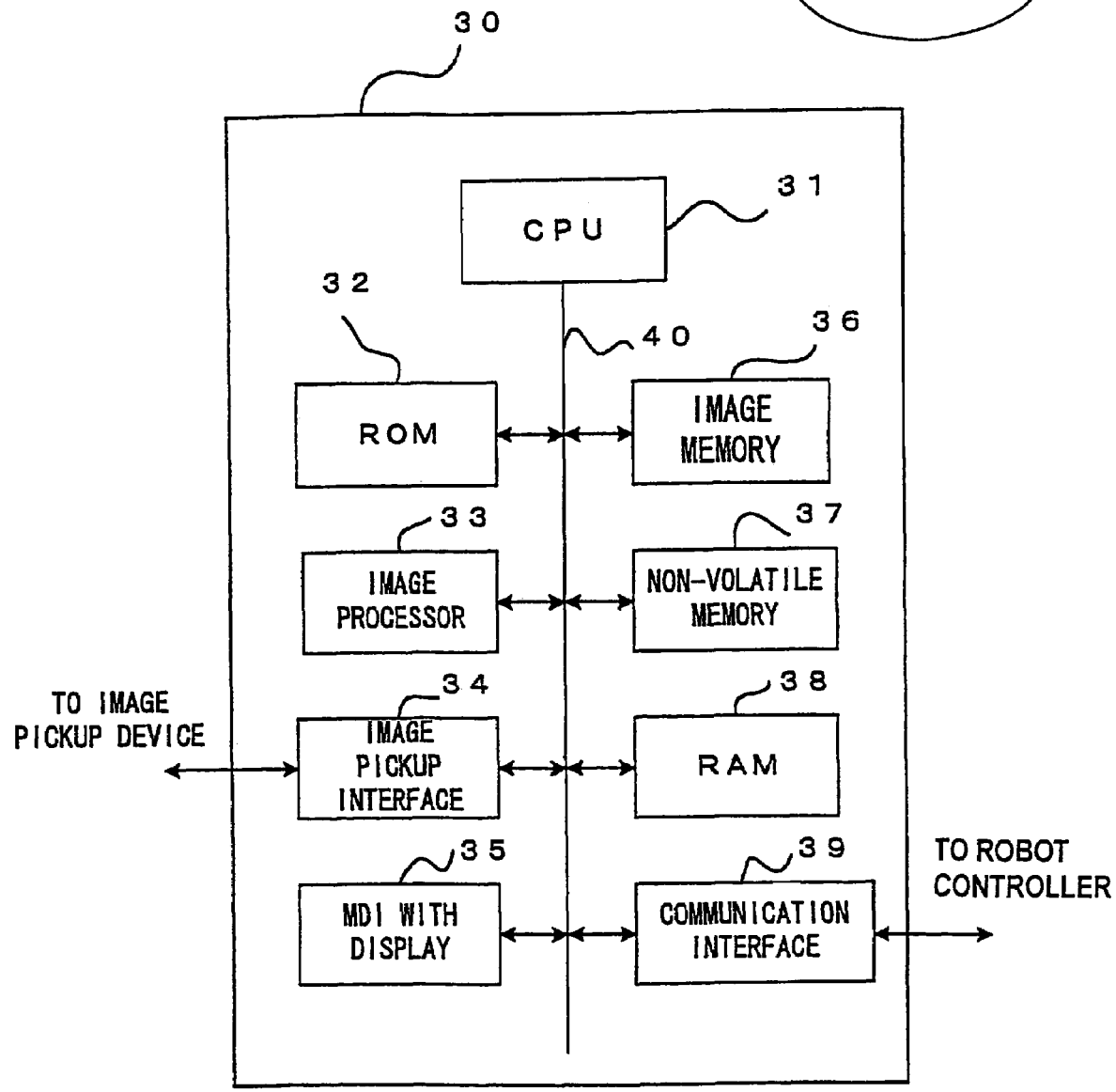
FIG. 6 is a block diagram showing an essential part of an image processing device in each of the above embodiments.

FIG. 6 is a block diagram showing an image processing device 30 connected to an interface of the robot controller. The image processing device 30 has a processor 31, and the processor 31 is connected through a bus 40 to a ROM 32 for storage of a system program or the like executed by the processor 31, an image processor 33, an image pickup device interface 34 connected to the image pickup device, an MDI 35 with display such as a CRT and a liquid crystal display for input and output of various commands and data, an image memory 36, a non-volatile memory 37, a RAM 38 for temporary storage and so on of data and a communication interface 39 connected to the robot controller 10.

An image produced by the image pickup device 20 is stored in the image memory 36. The image processor 33 conducts processing of the image stored in the image memory according to a command from the processor 31 to recognize the object. The image processing device 30 is similar in configuration and function to an image processing device in the prior art. However, according to the present invention, the image processing device 30 is characterized in that teaching models (described later) are stored in the non-volatile memory 37, and pattern matching is carried out by using the stored teaching models, for the image data of the pile of workpieces photographed by the image pickup device 20 to obtain three-dimensional position and posture of the workpiece.

As will be described later, the image pickup device 20 is to produce the image data, and a CCD camera for producing a two-dimensional image or a visual sensor permitting the measurement of distance data is available for the image pickup device 20. The CCD camera produces the image data from the two-dimensional image according to a conventionally known method, while the visual sensor for measurement of distance data is to produce, as image data, two-dimensional array data composed of distance data representing the distance between the sensor and the object. Since a three-dimensional visual sensor of spotlight scan type or the like disclosed in Japanese Patent Application Laid-open No. 7-270137 is well known as the visual sensor for measurement of distance data, a description will now be given of the three-dimensional visual sensor briefly.

The three-dimensional visual sensor is adapted for measuring the position of a beam spot irradiated onto the object with two scanners in arbitrary directions (X- and Y-directions) by using a detector (PSD) of position detection type.

Thus, this three-dimensional visual sensor is effective in finding the three-dimensional position of the object irradiated with the beam by calculation on the basis of mirror deflection angles θx, θy of two scanners together with a light detecting position on the PSD.

Figures 11, 12:
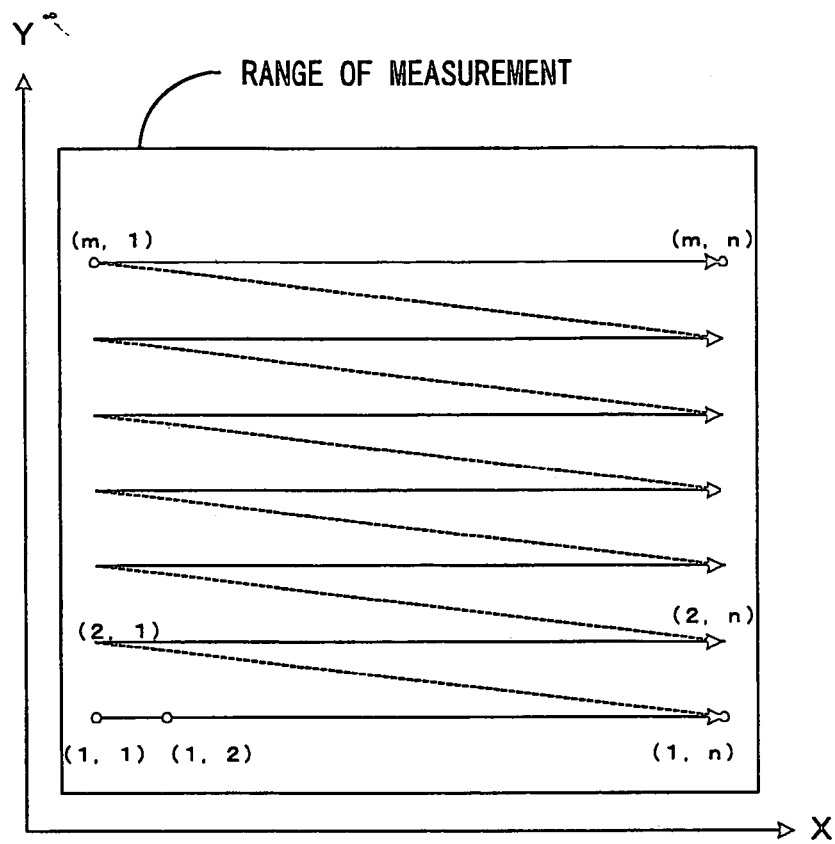
FIG. 11 is a view for explaining the operation of a visual sensor for measurement of distance data for use in the embodiments according to the present invention.
FIG. 12 is a view for explaining two-dimensional array data composed of distance data as image data produced by the above visual sensor for measurement of distance data.
Figure 13:
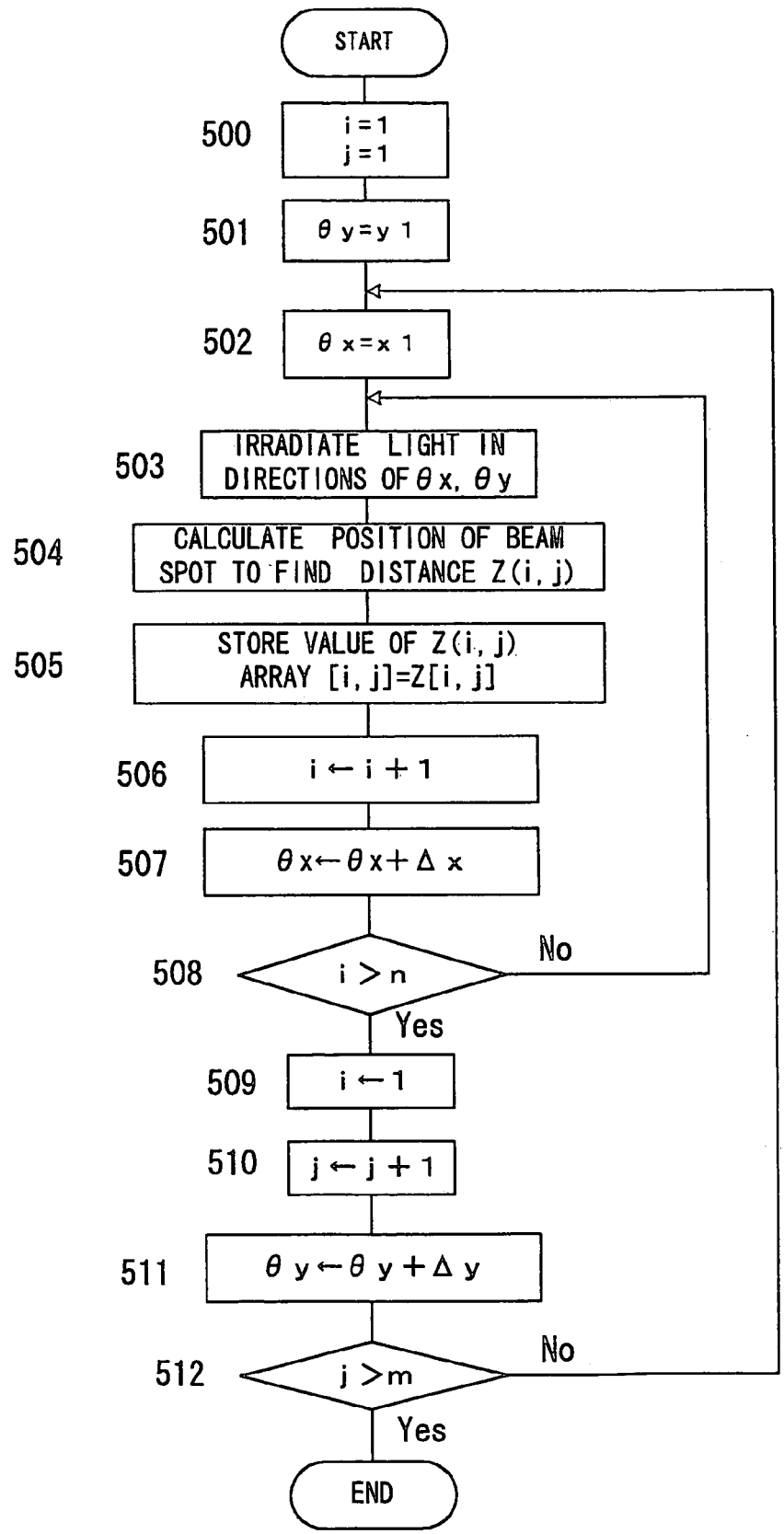
FIG. 13 is a flow chart showing the procedure to produce two-dimensional array data as the above image data.

A description will now be simply given of a method of producing, as image data, two-dimensional array data composed of distance data with this three-dimensional visual sensor with reference to FIGS. 11 to 13.

The range of scan over the object (the range of measurement) is determined in advance, and in this state, the three-dimensional visual sensor makes measurement of the three-dimensional position in each point on the X-Y plane in the predetermined range of scan to find the distance Z (i, j) in each point (i, j) between the sensor and the point of the beam irradiated onto the object in the manner of making a scan over the object in sequence of points (1, 1) to (1, n), (2, 1) to (2, n), . . . (m, 1) to (m, n) on the above X-Y plane under discrete control of the mirror deflection angles θx, θy of the scanners, as shown in FIG. 11. Then, this distance data Z (i, j) is stored in the RAM 38 of the image processing device 30.

With the above operation, the three-dimensional visual sensor may produce, as image data, the two-dimensional array data composed of the distance data Z (i, j) between the sensor and the point of the beam irradiated onto the object, as shown in FIG. 12.

FIG. 13 is a flow chart showing the processing performed by the processor 31 of the image processing device 30 to produce the image data.

Firstly, indexes i, j are set at "1" (Step 500) to issue a command to irradiate to the sensor 20, together with commanded mirror deflection angles θx, θy corresponding to the start points y1, x1 (the point (1, 1) in FIG. 11) in the predetermined range of measurement (Steps 501 to 503). The sensor 20 irradiates optical beams after the mirrors are set at these deflection angles. Then, the sensor 20 outputs a signal produced by the PSD to the image processing device 30.

The processor 31 of the image processing device 30 calculates the position of a beam spot formed on the object on the basis of the signal from the PSD and the commanded mirror deflection angles θx, θy to find the distance Z (i, j) between the sensor and the beam spot position, and then stores the distance data in the RAM 28 as two-dimensional array data [i, j] (Steps 504 and 505). Instead of the processor 31, the sensor 20 may be applied to calculation of finding the position of the beam spot formed on the object and also that of finding the distance Z (i, j) on the basis of the above beam spot position.

Subsequently, the processor 31 increments the index i by "1" to increase the mirror deflection angle θx in X-axial scanning by a predetermined amount Δx (Steps 506, 507), and decides whether or not the index i exceeds a set value n (Step 508). If not exceeding, the processing is returned to Step 503 to find the distance Z (i, j) in the next point by repeating the processing in Steps 503 to 508. Subsequently, the processing in Steps 503 to 508 is executed for finding and storing the distance Z (i, j) at each point from (1, 1) to (1, n) in FIG. 11 until the index i exceeds the set value n.

When it is decided in Step 508 that the index i exceeds the set value n, the processor 31 sets the index i at "1", and increments the index j by "1" to increase the mirror deflection angle θy in Y-axial scanning by a predetermined amount Δy (Steps 509 to 511). Subsequently, the processor 31 decides whether or not the index j exceeds a set value m (Step 512). If not exceeding, the processing is returned to Step 502 to repeat the processing in Steps 502 to 512.

As described above, the processing in Steps 502 to 512 is performed repeatedly until the index j exceeds the set value m. The measurement of all the points in the range of measurement (the range of scan) shown in FIG. 11 is considered to be finished as of the time when the index j exceeds the set value m. Then, the distance data Z (1, 1) to Z (m, n) serving as the two-dimensional array data is stored in the RAM 28, resulting in the completion of the processing to produce the image data.

The above processing is applied to produce the two-dimensional array data as the image data with the visual sensor for measurement of distance data.

The two-dimensional array data produced as described above may be used as the image data to generate teaching models. However, for simplification, a description will now be given of the procedure to generate teaching models on the basis of the image data produced by taking in the image of the object with the CCD camera 20 serving as an image pickup device for taking in image data.

Figure 7:
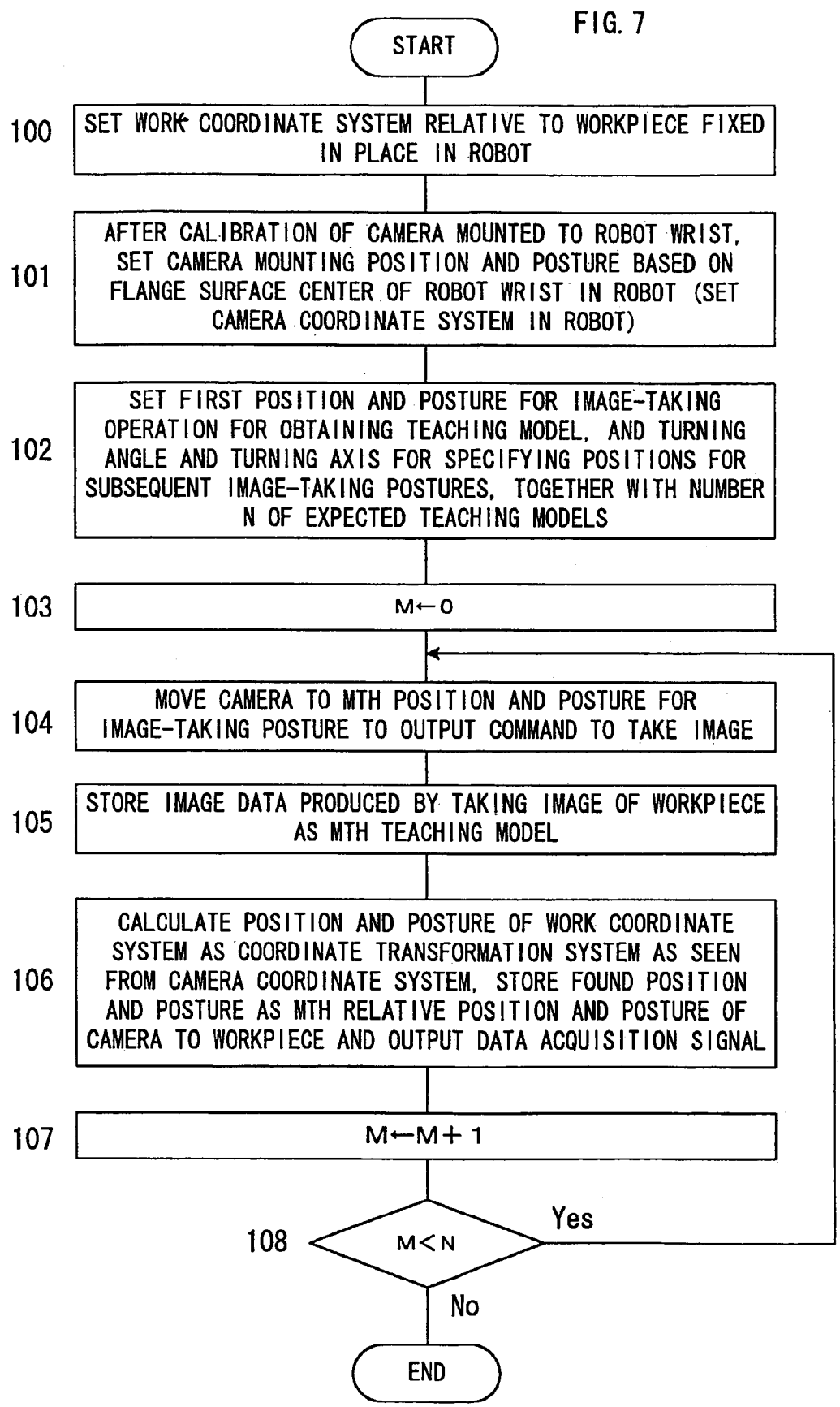
FIG. 7 is a flow chart showing the procedure to generate teaching models in the first embodiment.

A description will be given of the procedure to generate teaching models by using the teaching model generating device according to the present embodiment configured by the robot controller 10 and the image processing device 30 with reference to the flow chart shown in FIG. 7.

An operator sets a work coordinate system as to the workpiece fixed in place in the robot controller 10 through the teaching operation panel 4. The work coordinate system is stored in the robot controller (Step 100). In this place, the meaning of setting of the work coordinate system is that a coordinate transformation matrix of the work coordinate system as seen from a world coordinate system provided in the robot is set in the robot controller.

Then, calibration of the camera mounted to the robot wrist is performed and camera mounting position and posture based on the center of the flange surface of the robot wrist is set in the robot control device 10. As a result, a camera coordinate system is set in the robot (Step 101).

Then, for specifying the first ($0^{th}$) position and posture of the camera mounted to the end of the robot wrist for the image-taking operation with respect to the workpiece W and subsequent positions and postures, a turning axis and a turning angle for turning the camera from the first position and posture is set, and also the number N of positions and postures which the camera assumes for the image-taking operation is set (Step 103).

For instance, four teaching models are generated on the basis of four image data produced by taking the image of the workpiece W from four directions (N=4) as shown in FIG. 4.

FIG. 4(a) shows a first teaching model generated through the image-taking operation with the camera in the $0^{th}$ position and posture. The first teaching model is generated on the basis of the image data produced by taking the image of the top of the workpiece W with the camera from the Z-axis direction of the world coordinate system.

Subsequently, the robot is operated to turn the camera by a certain angle about an axis, which passes through a specific point (an origin of the work coordinate system) on the workpiece W and is perpendicular to the center axis of the camera, to the first position and posture for the image-taking operation. Incidentally, when the Z-axis of the world coordinate system is set to be parallel to the center axis of the camera in the first ($0^{th}$) position and posture, the first position and posture next to the $0^{th}$ position and posture for the image-taking operation assume to be the position and posture provided by turning the camera by a certain angle (for instance, 30 degrees) about an axis parallel to the axis (for instance, the X-axis) perpendicular to the Z-axial direction as shown in FIG. 4(b). Then, the second teaching model is generated on the basis of the image data (see FIG. 4(b)) produced by taking the image of the workpiece W with the camera in the above first position and posture.

Thereafter, in the same way, the camera is caused to turn by 60 and 90 degrees respectively from the position shown in FIG. 4(a) about the axis, which passes through the specific point on the workpiece and is parallel to the X-axis, to the second and third positions and postures for the image-taking operation to take the image of the workpiece W respectively. Then, the third and fourth teaching models are generated on the basis of the image data (see FIGS. 4(c) and 4(d)) obtained from the images the camera took at the respective positions and postures.

In this place, a description will be given of one example of generating four teaching models in the above manner with respect to the workpiece serving as the object and application of these models. Incidentally, in the above embodiment, camera is caused to turn by 0, 30, 60 and 90 degrees about the workpiece serving as the object to generate four teaching models by taking the image of the workpiece with the camera from the respective positions. Alternatively, if the turning angle of the robot to turn the camera is set at a smaller pitch for generation of more teaching models, it is possible to detect the three-dimensional position and posture of the workpiece with higher accuracy.

As described above, the position and posture of the robot where the first ($0^{th}$) image-taking operation is performed with the camera 20 mounted to the end of the robot wrist are taught together with the axis serving as the center axis of turning and the turning angle, and the number N of positions and postures for the image-taking operation is set. For easy understanding, it is assumed that the position in which the center axis of the camera is parallel to the Z-axis of the world coordinate system and which has the same coordinate values of the X- and Y-axes, other than the Z-axis, on the world coordinate system as those of the workpiece W put in predetermined position and posture is taught as the position and posture for generating the $0^{th}$ teaching model. Further, the positions turned by 30, 60 and 90 degrees about the axis, which passes through the position of the workpiece W and is parallel to the X-axis of the world coordinate system, are set as the first, second and third positions and postures for the image-taking operation. It is also assumed that the number N of positions for the image-taking operation is set at "4".

When a command to generate the teaching model is supplied through the teaching operation panel 4, the processor 1 of the robot controller 10 initializes a counter M for counting the image-taking times to "0" (Step 103), and outputs a command to take the image with the camera to the image processing device 30 after operating the robot to move the camera to the Mth (=0) position and posture (Step 104). The image processing device 30, in response to the above command, causes the camera to take the image of the workpiece W and stores the image data in the image memory 36. In addition to the above operation, the image processing device 30 generates the Mth teaching model on the basis of the image data and stores the generated Mth teaching model in the non-volatile memory 37 (Step 105), Further, the image processing device 30 calculates the position and posture of the work coordinate system as a coordinate transformation matrix as seen from the camera coordinate system to find the relative position and posture of the camera to the workpiece, and then stores the found relative position and posture in the non-volatile memory 37 as the relative position and posture of the Mth teaching model and outputs a data acquisition signal to the robot controller (Step 106). For instance, the above relative position and posture are stored in the form of [x0, y0, z0, α0, β0, γ0,] c as the position and posture of the camera coordinate system, where α, β and γ represent the turning angles about the X-, Y- and Z-axes, respectively, and "C" represents the camera coordinate system.

Subsequently, the processor 1 of the robot controller 10 increments the counter M by "1" in response to the data acquisition signal (Step 107), and decides whether or not the value of the counter M is smaller than the set value N (=4) (Step 108). When the counter value is smaller than the set value, the processing is returned to Step 104 to move the robot to the Mth position and posture. That is, in the above embodiment shown in FIG. 4, the cam is caused to turn by 30 degrees about the axis, which passes through the position of the workpiece and is parallel to the X-axis of the world coordinate system, to store the teaching model and the relative position and posture of the camera to the workpiece at that time.

In the following operation, the processing in Steps 104 to 108 is executed for storing the generated teaching model and the relative position and posture of the camera to the workpiece in the non-volatile memory until the value of the counter M reaches the set value N (=4). In the above example, the teaching models to be stored are those produced from the image of FIGS. 4(a) to 4(d). For the above four teaching models, the relative position and posture of the camera to the workpiece are stored in the form of [x0, y0, z0, α0, β0, γ0]c, [x1, y1, z1, α1, β1, γ1]c, [x2, y2, z2, α2, β2, γ2]c and [x3, y3, z3, 3α, β3, γ3]c as the positions and postures of the workpiece W of the camera coordinate system.

With the above operation, the teaching model and the relative position of the camera to the workpiece are stored in the non-volatile memory 37 of the image processing device 30.

Figure 2:
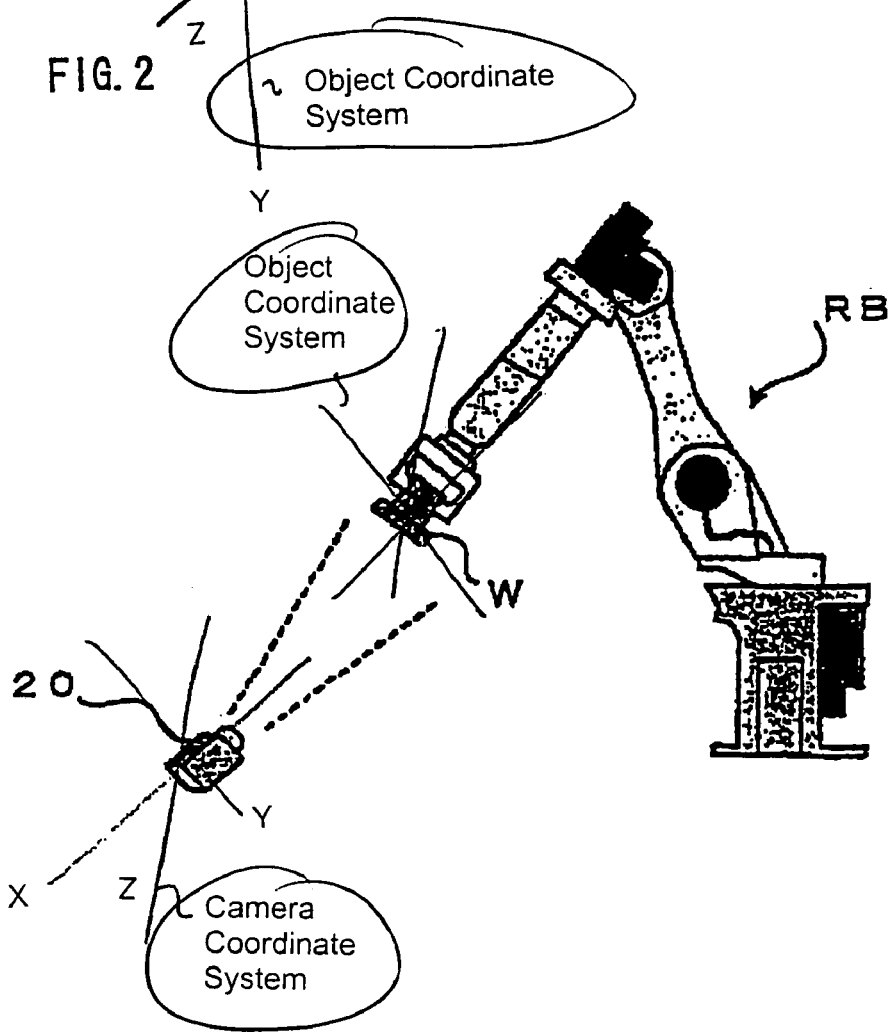
FIG. 2 is a view for explaining the outline of a second embodiment according to the present invention.
Figure 8:
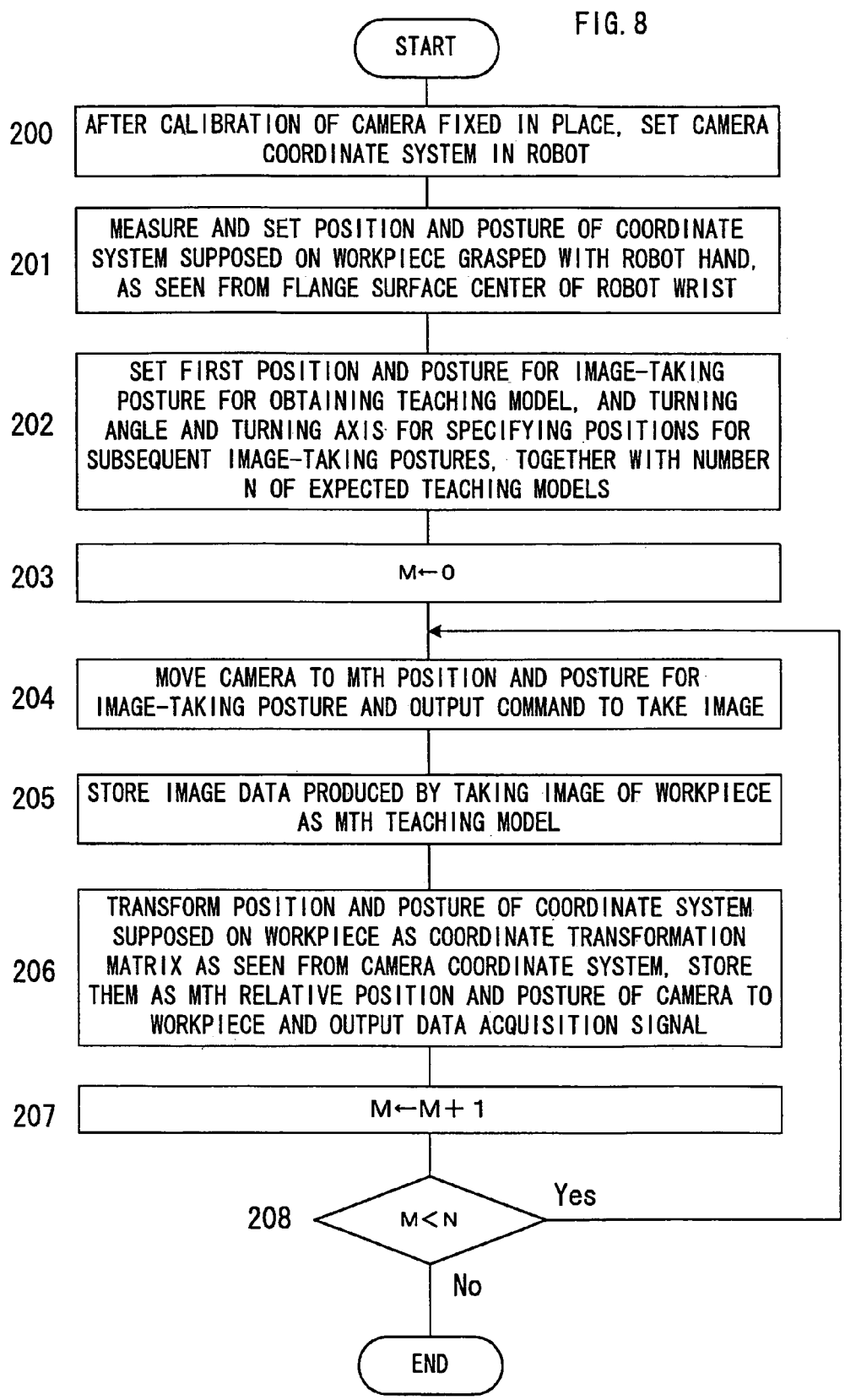
FIG. 8 is a flow chart showing the procedure to generate teaching models in the second embodiment.

FIG. 2 is a schematic view showing the second embodiment according to the present invention. The second embodiment is different from the first embodiment shown in FIG. 1 in that the camera 20 is fixed in place, and the workpiece W serving as the object is grasped with the hand mounted to the end of the robot wrist or is fixed to the movable part of the robot for generation and storage of the teaching model. The robot controller 10 and the image processing device 30 in the second embodiment are similar in configuration to those in the first embodiment, except for the processing for generation of the teaching model. FIG. 8 shows the flow of the procedure to generate the teaching model.

After calibration of the camera 20 fixed in place, the camera coordinate system is set in the robot controller 10 and stored in the memory 2 (Step 200). Accordingly, the coordinate transformation matrix of the camera coordinate system as seen from the world coordinate system may be produced.

Then, the operator sets, in the robot controller 10, the position and posture of the robot wrist, as seen from the center of the flange surface of the robot wrist in the coordinate system (the work coordinate system) supposed on the workpiece grasped with the robot hand (or fixed to the movable part of the robot) are measured and the measured data is set in the robot controller 10 and stored in the memory 2. As a result, the robot is allowed to recognize the position and posture in the coordinate system (the work coordinate system) supposed on the workpiece when the robot is at any position.

Then, similarly to the first embodiment, the operator sets the first ($0^{th}$) position and posture of the workpiece W grasped with the robot hand for the image-taking operation with the camera 20 fixed in place, together with the turning axis and turning angle of the robot to turn the workpiece with respect to the camera 20 fixed in place from the first position and posture in order to specify the positions and postures for the subsequent image-taking operations (Step 202).

The positions and postures resulting from turning the workpiece grasped with the robot hand by 30, 60 and 90 degrees about the axis passing through the camera 20 and being parallel to the X-axis of the work coordinate system are set as the first, second and third positions for the image-taking operation in the similar manner to the first embodiment. As long as the number N of positions for the image-taking operation is set at "4", it is possible to generate the similar teaching models to the first embodiment as shown in FIG. 4.

When a command to generate the teaching model is supplied through the teaching operation panel 4, the processor 1 of the robot controller 10 initializes the counter M to "0", operates the robot so that the workpiece W moves to the Mth (=0) position and posture and issues a command to take the image with the camera 20 to the image processing device 30 (Steps 203, 204).

The image processing device 30 takes the image of the workpiece W with the camera in response to the above command and generates the Mth teaching model on the basis of the image data produced from the image, and stores the generated teaching models in the non-volatile memory 37. Further, the image processing device 30 calculates the position and posture of the coordinate system (the work coordinate system) supposed on the workpiece as the coordinate transformation matrix as seen from the camera coordinate system, stores the calculated position and posture in the non-volatile memory 37 as the Mth teaching model for the relative position and posture of the camera to the workpiece and outputs a data acquisition signal to the robot controller (Steps 204 to 206).

The processor 1 of the robot controller 1 increments the counter M by "1" in response to the data acquisition signal (Step 207), and decides whether or not the value of the counter M is smaller than the set value N (=4). When the value of the counter M is smaller than the set value N, the processing is returned to Step 204 to move the robot to the Mth position and posture.

In the following operation, the processing in Steps 204 to 208 is executed for storing the teaching model and the relative position and posture of the camera to the workpiece in the non-volatile memory 37 in the same way as in the first embodiment until the value of the counter M reaches the set value N (=4).

Figure 3:
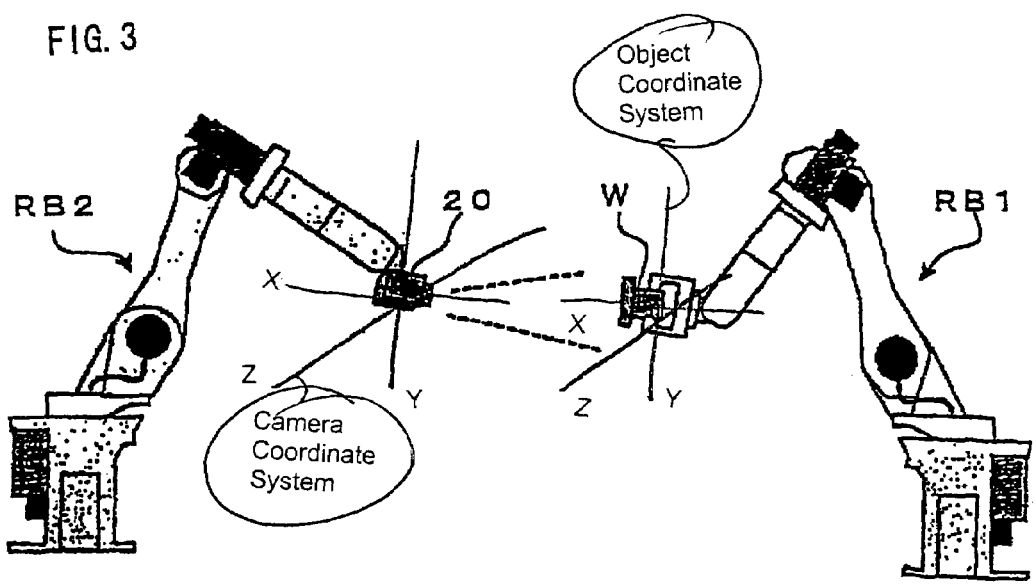
FIG. 3 is a view for explaining the outline of a third embodiment according to the present invention.

FIG. 3 is a schematic view showing the third embodiment according to the present invention. According to the third embodiment, both the workpiece and the camera are respectively fixed to the movable parts of the robots or are grasped with the hands thereof for generation of the teaching model. The robot controllers of robots RB1, RB2 in the third embodiment are substantially similar in configuration to that shown in FIG. 5, except that two robot controllers are connected together through the communication interface and that the image processing device 30 is connected to only the second robot controller. The image processing device 30 is also similar in configuration to that shown in FIG. 6.

The workpiece W serving as the object is grasped with the hand of the first robot RB1 and the camera 20 is mounted to the wrist of the second robot RB2. The position and posture of the second robot RB2 in the world coordinate system as seen from the world coordinate system of the first robot RB1 is measured to find the coordinate transformation matrix (A), which is then stored in the first robot controller (Step 300).

Further, the coordinate transformation matrix (B) of the position and posture of the coordinate system (the work coordinate system) supposed on the workpiece W grasped with the hand of the first robot RB1, as seen from the center of the flange surface of the robot wrist, are set and stored in the robot controller of the first robot RB1 (Step 301). Calibration of the camera 20 mounted to the wrist of the second robot RB2 is performed and the transformation matrix (C) from the center of the flange surface of the second robot wrist to the camera coordinate system is set and stored in the robot controller of the first robot RB1 (Step 302).

Further, like the first and second embodiments, the position and posture of each of the first and second robots are set in each of the robot controllers such that the camera 20 and the workpiece W of which image the camera 20 first takes to assume the first ($0^{th}$) relative position and posture for the image-taking operation. Subsequently, the first, second, . . . and ith positions and postures for the image-taking operation are set together with the number N of positions and postures for the image-taking operation. According to the third embodiment, the relative position and posture of the camera to the workpiece are set by turning any one or both of the camera and the workpiece by a predetermined turning angle relatively to each other in a manner such that the second robot RB2 mounted with the camera is operated to turn the camera relatively to the workpiece W without shifting the position and posture of the first robot RB1 grasping the workpiece W from the first position and posture, or that the first robot RB1 is operated to turn the workpiece W while the camera 20 is fixed in place without shifting the position and posture of the second robot RB2.

Further, the turning axis of each of the robots is set to be an axis which is orthogonal to the center axis of the camera 20 parallel to an axis of each world coordinate system and also passes through the center position (the origin of the camera coordinate system or the origin of the work coordinate system) of the other party. For instance, in the embodiment shown in FIG. 3, the angles the workpiece W or camera 20 turns about Z axis (vertical axis) of each of the world coordinate system which passes through the camera 20 or the workpiece W is set. For simple setting of the turning axis and turning angle, one of the workpiece W and the camera 20 is turned with the other fixed in place. However, in the case where the robot operated for turning the workpiece or the camera is prevented from moving, the other robot for keeping the camera or the workpiece fixed is driven such that the camera and the workpiece assume the relative position and posture set in advance (Step 303).

When the command to generate the teaching model is supplied through the teaching operation panel 4 any of one of the robot controllers, the processor 1 of the robot controller 10 of each of the robots RB1, RB2 initializes the counter M to "0" operates the robot to move the workpiece W to the Mth ($0^{th}$) position and posture and issues a command to take the image with the camera 20 to the image processing device 30 (Steps 304, 305). The image processing device 30 takes the image of the workpiece W with the camera in response to the above command, generates the Mth teaching model on the basis of the image data produced from the image and stores the generated teaching model in the non-volatile memory 37 (Step 306).

Further, the position and posture of the coordinate system supposed on the workpiece W is obtained as the coordinate transformation matrix (D) as seen from the world coordinate system of the first robot, on the basis of the position and posture of the first robot as of the time of image-taking operation and also the coordinate transformation matrix (B) set in Step 301. In addition, the position and posture as seen from the camera coordinate system is obtained as the coordinate transformation matrix (E) as seen from the world coordinate system of the second robot, on the basis of the position and posture of the second robot and also the coordinate transformation matrix (C) set in Step 302 (Step 307). The position and posture supposed on the workpiece W is transformed into the coordinate transformation matrix (F) as seen from the camera coordinate system through the operation of the following expression (1) on the basis of the coordinate transformation matrices (D), (E) found as described above and also the coordinate transformation matrix (A) set in Step 300, and is stored as the Mth relative position and posture, and then the data acquisition signal is outputted to both the robot controllers.

$$(F)=(E)^{-1}(A)^{-1}(D) \qquad (1)$$

The processor 1 of each robot controller 10 increments the counter M by "1" in response to the data acquisition signal (Step 308), and decides whether or not the value of the counter M is smaller than the set value N (=4) (Step 309). When the value of the counter M is smaller than the set value, the processing is returned to Step 305 to move the robot to the Mth position and posture.

In the following operation, the processing in Steps 305 to 310 is executed for storing the teaching model and the relative position and posture of the camera 20 to the workpiece W in the non-volatile memory 37 in the same manner as in the above first and second embodiments until the value of the counter M reaches the set value N.

In addition to the above three kinds of embodiments for generation of the teaching models, a description will now be given of the application of the teaching models to the case of starting a picking job to pick out the individual workpiece from the pile of workpieces W, for instance.

Figure 10:
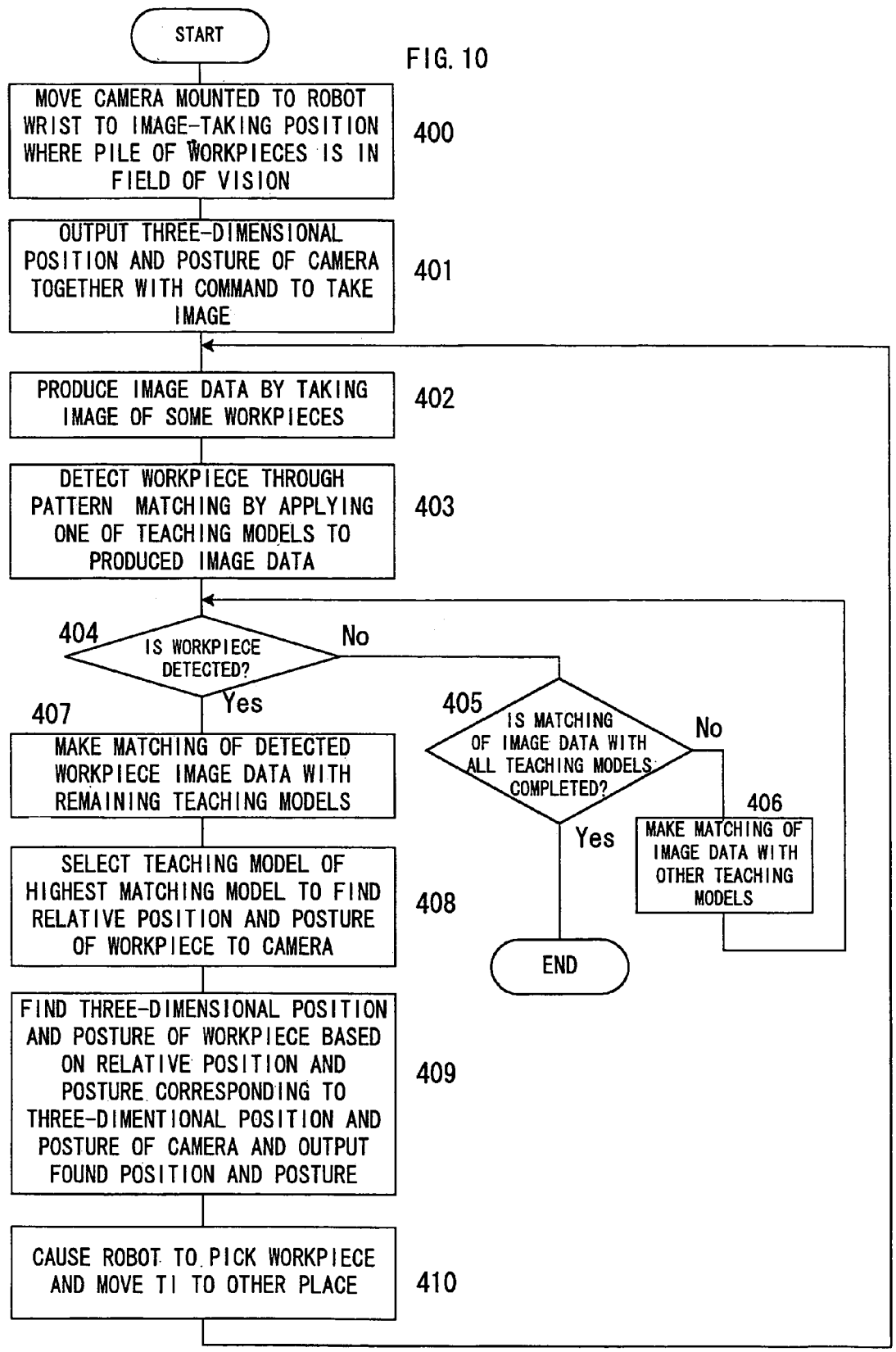
FIG. 10 is a flow chart showing the procedure of picking job.

The robot wrist is mounted with the camera together with the hand. When a command to pick a workpiece is supplied through the teaching operation panel or the like to the robot controller 10, the processor 1 starts the procedure of the picking job as shown in FIG. 10.

After operating the robot to move the camera mounted to the wrist of the taught robot to the image pickup position where the piled workpieces are in the field of vision of the camera, the processor 1 firstly outputs the three-dimensional position and posture of the camera on the world coordinate system to the image processing device 30 together with a command to take the image of the workpiece (Steps 400, 401).

The processor 31 of the image processing device 30 takes the image of the pile of workpiece in response to the image pickup command, data obtains the image data of several workpieces, and stores in the image memory 36 (Step 402).

Subsequently, the processor 31 detects a workpiece by performing pattern matching by using one (the $0^{th}$ teaching model) of the teaching models stored in the non-volatile memory 37 (Step 403). In the above pattern matching, variations in position, tuning and scale of the image of the workpieces are detected. Then, the processor 31 decides whether or not the detected workpiece has a matching value of not less than a reference value (Step 404). When the workpiece having the matching value of not less than the reference value is not found, the processor 31 further decides whether or not the pattern matching was completed for all the teaching models (the $0^{th}$ to $3^{rd}$ teaching models) (Step 405). If not completed yet, the processor 31 makes the pattern matching of the image data with the other teaching model (Step 406).

When the image data of the workpiece having the matching value of not less than the certain reference value is detected through the pattern matching of the image data with any of the teaching models in Step 404, pattern matching of the detected image data of the workpiece is carried out with all the other teaching models. That is, the processor 31 carries out the pattern matching of the detected image data of the workpiece with all the stored teaching models (Step 407).

The processor 31 selects the teaching model of the highest matching value obtained by the above pattern matching to obtain the ultimate relative position and posture of the camera to the workpiece on the basis of the relative position and posture of the camera to the workpiece stored in association with the selected teaching model and also the amount of variations in position, turning and scale within the image in the pattern matching of the image data with respect to the selected teaching model.

Then, the processor 31 finds the position and posture of the workpiece on the world coordinate system on the basis of the above ultimate relative position and posture and also the position and posture of the camera in the world coordinate system sent through the processing in Step 401 and outputs the above found position and posture. That is, since the relative position and posture of the workpiece to the camera is the position and posture of the workpiece as seen from the camera coordinate system, the position and posture of the detected workpiece on the work coordinate system may be found through operation of coordinate transformation on the basis of the data of the above position and posture and also the data of the position and posture of the camera in the world coordinate system (Step 409).

The robot controller 10 actuates the robot on the basis of the transmitted three-dimensional position and posture of the detected workpiece W, picks the detected workpiece and move the workpiece to a predetermined taught position in the manner similar to the prior art (Step 410). Then, the processing is returned to Step 402 to repeat the processing from Step 402.

When all the workpieces are picked from the pile of workpieces, a matching value of not less than the certain reference value can not be detected any more by conducting the pattern matching of the image data with all the teaching models in the processing in Steps 403 to 406, so that the picking job is finished.

What is claimed is:

1. A teaching model generating device for image processing, in which a subject object has the same or substantially similar shape as that of a reference object, the device comprising:

an image processing system with which a current three-dimensional orientation of the subject object relative to an image pickup device is recognized by carrying out pattern matching processing of an image of the subject based on a plurality of pre-determined teaching models of the reference object; and an image-capture system, in advance of the recognizing, generating and storing the plurality of teaching models on the basis of respective image data produced by taking images of said reference object from a plurality of directions, wherein one of the reference object and said image pickup device is fixed to a movable and positionable part of a robot or is grasped with a hand of the robot, and said robot is operated for positioning to a plurality of different image pickup positions and directions, so that the image data respectively obtained at each of said different image pickup positions and direction information indicating the respective different direction, is stored as a teaching model.

2. A teaching model generating device for image processing, in which a subject object has the same or substantially similar shape as that of a reference object, the device comprising:

an image processing system with which a current three-dimensional orientation of the subject object relative to an image pickup device is recognized by carrying out pattern matching processing of an image of the subject based on a plurality of pre-determined teaching models of the reference object; and an image-capture system, in advance of the recognizing, generating and storing the plurality of teaching models on the basis of respective image data produced by taking images of said reference object from a plurality of directions, wherein the reference object is fixed to a movable part of a first robot or is grasped with a hand of the first robot, and said image pickup device is fixed to a movable and positionable part of a second robot or is grasped with a hand of the second robot, and any one of or both of said first and second robots is operated for positioning to a plurality of different relative image pickup positions and directions, so that the image data respectively obtained at each of said different image pickup positions is stored as a teaching model.

3. A teaching model generating device according to claim 1, wherein said teaching model is a part of the image data of the reference object.

4. A teaching model generating device according to claim 1, wherein said teaching model comprises data obtained by performing image processing on the image data of the reference object.

5. A teaching model generating device according to claim 2, wherein said teaching model is generated for every direction in which said image pickup device took the image of said reference object and said teaching model is stored in association with information on the direction.

6. A teaching model generating device according to claim 2, wherein said image pickup device is a camera.

7. A teaching model generating device according to claim 2, wherein said image pickup device is a three-dimensional visual sensor that measures a distance between the image pickup device and a plurality of points on the object.

8. A method for teaching model generation and image processing, comprising:

determining a current three-dimensional orientation of a subject object relative to an image pickup device by carrying out pattern matching processing of an image of the subject based on a plurality of predetermined teaching models of a reference object; and in advance of the determining, generating and storing the plurality of teaching models on the basis of respective image data produced by taking images of said reference object from a plurality of directions, wherein one of the reference object and said image pickup device is fixed to a movable and positionable part of a robot or is grasped with a hand of the robot, and said robot is operated for positioning to a plurality of different image pickup positions and directions, so that the image data respectively obtained at each of said image pickup positions and direction information indicating the respective different direction, is stored as a teaching model.

9. A method of automatic orientation recognition, comprising:

generating and storing a set of images of different relative orientations of a subject, the images having been captured by a plurality of robotic operations corresponding to the different relative orientations of the subject, and associating with each image information indicating its respective relative orientation of the subject;

after the generating and storing, from a known current orientation of a robot, capturing a current image of a workpiece that has an unknown orientation relative to an image pickup device on the robot before the robot has come into contact with the workpiece, where the workpiece has a shape substantially similar to the shape of the subject;

after the capturing, using pattern matching to match one of the stored images with the current image; and after the pattern matching, and before the robot has come into contact with the workpiece, determining the orientation of the workpiece relative to the image pickup device on the robot based on the relative orientation information associated with the matched stored image, and also based on the known current orientation of the robot.

10. A method according to claim 9, further comprising automatically maneuvering the robot to the workpiece based at least on the determined orientation of the workpiece relative to the robot.

11. A method according to claim 9, wherein the generating and storing is performed for a plurality of differently shaped subjects, wherein the current image includes a plurality of differently shaped workpieces, and wherein the pattern matching further comprises identifying the workpiece from among the plurality of differently shaped workpieces using the images and orientation information of the plurality of differently shaped subjects.

12. A method of automatic orientation recognition, comprising:

generating and storing a set of images of different relative arrangements of a subject, the images having been captured by a plurality of robotic operations corresponding to the different relative arrangements, and associating with each image information indicating its respective relative arrangement of the subject;

with a known current arrangement of an image pickup device on a robot, capturing a current image of a workpiece with an unknown current arrangement relative to the robot, where the workpiece has a shape substantially similar to the shape of the subject;

using pattern matching to match one of the stored images with the current image; and determining the current orientation of the workpiece relative to the image pickup device on the robot based on the relative arrangement information associated with the matched stored image, and also based on the known current arrangement of the image pickup device on the robot.

13. A method, comprising:

robotically taking images of a subject with different three-dimensional subject-camera arrangements that vary in three dimensions, and associating with each image or data thereof information indicating its subject-camera arrangement; then taking a current image of a workpiece shaped like the subject; and then before picking up the workpiece determining a current workpiece-camera orientation by matching one of the images or data thereof with the current image, and using predetermined subject-camera arrangement information of the matched image to determine the three-dimensional orientation of the workpiece relative to the camera.

14. At least one computer-readable medium storing instructions that when executed control a robot apparatus to perform a method comprising:

robotically taking images of a subject with a camera in different subject-camera arrangements varying in three dimensions;

associating with each image, information indicating an obtaining subject-camera arrangement used in obtaining the image;

after said associating of the images, taking a current image of a workpiece shaped like the subject;

determining a current workpiece-camera orientation by matching one of the images with the current image and using the information indicating the obtaining subject-camera arrangement associated with the one of the images; and picking up the workpiece after said determining.

* * * * *

UNITED STATES PATENT AND TRADEMARK OFFICE
CERTIFICATE OF CORRECTION

| | | |
|---|---|---|
| PATENT NO. | : 7,200,260 B1 | Page 1 of 1 |
| APPLICATION NO. | : 09/546213 | |
| DATED | : April 3, 2007 | |
| INVENTOR(S) | : Atsushi Watanabe et al. | |

Figure 9:
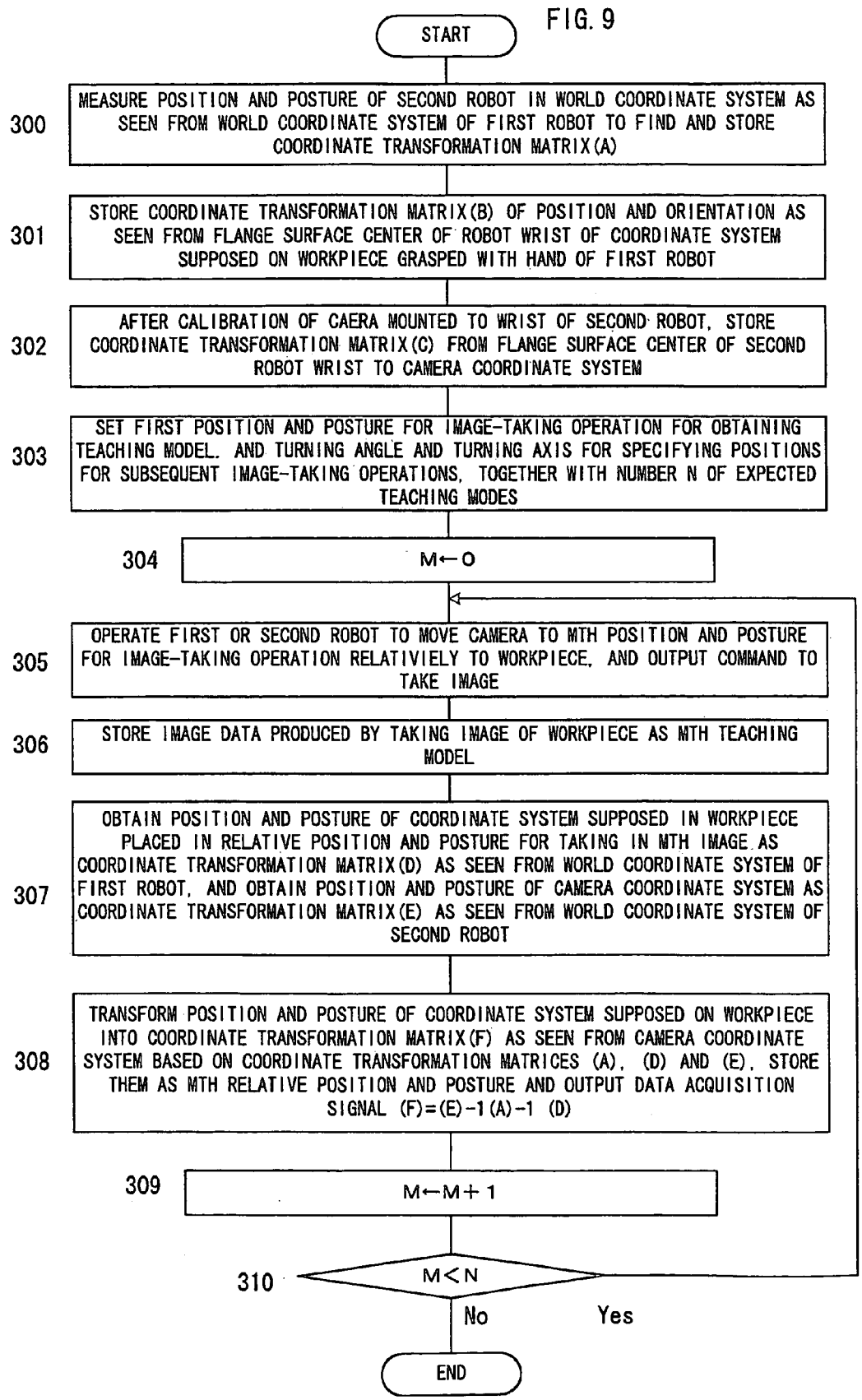
FIG. 9 is a flow chart showing the procedure to generate teaching models in the third embodiment.

It is certified that error appears in the above-identified patent and that said Letters Patent is hereby corrected as shown below:

Sheet 7 of 10, Box 302, Fig. 9, Line 1, change "CAERA" to --CAMERA--.

Sheet 7 of 10, Box 303, Fig. 9, Line 2, change "MODEL." to --MODEL,--.

Sheet 7 of 10, Box 305, Fig. 9, Line 2, change "RELATIVIELY" to --RELATIVELY--.

Sheet 8 of 10, Box 409, Fig. 10, Line 5, change "THREE-DIMENTIONAL" to --THREE-DIMENSIONAL--.

Sheet 8 of 10, Box 410, Fig.10, Line 2, change "TI" to --IT--.

Column 1, Line 19, after "as a teaching model" insert --,--.

Column 1, Line 60, after "For this selected teaching model" insert --,--.

Column 2, Line 42, change "a" to --an--.

Column 7, Line 63, change "(Step 105)," to --(Step 105).--.

Column 11, Line 68, change "tuning" to --turning--.

Signed and Sealed this

Seventh Day of August, 2007

JON W. DUDAS
*Director of the United States Patent and Trademark Office*